United States Patent [19]

Farrell

[11] Patent Number: 4,945,782
[45] Date of Patent: Aug. 7, 1990

[54] MOUNTING DEVICE FOR SECURING A RING GEAR TO A DRIVE DRUM

[75] Inventor: Michael J. Farrell, Brownsburg, Ind.

[73] Assignee: General Motors Corporation, Detroit, Mich.

[21] Appl. No.: 344,784

[22] Filed: Apr. 28, 1989

[51] Int. Cl.⁵ .................. F16H 55/00; F16H 55/12; F16D 13/52; F16B 3/00

[52] U.S. Cl. ........................................ 74/431; 74/447; 192/70.2; 403/359; 403/365

[58] Field of Search ............... 74/650, 431, 447; 403/359, 365, 377; 192/70.2, 70.19, 115

[56] References Cited

U.S. PATENT DOCUMENTS 2,433,240 12/1947 Schlage ............................. 403/359
4,813,522 3/1989 Fujioka et al. ..................... 192/70.2

Primary Examiner—Leslie A. Braun
Assistant Examiner—Harold F. Macris
Attorney, Agent, or Firm—Donald F. Scherer

[57] ABSTRACT

The present invention is utilized for demountable securing a power take-off ring gear to the clutch drum on the clutch housing of a vehicular transmission. Specifically, a mounting sleeve releasably secures the power take-off ring to the clutch drum. The mounting sleeve has a generally annular body portion configured as an alternating series of circumferentially spaced, radially outer, crown plate portions and circumferentially spaced, root plate portions displaced radially inwardly with respect to the crown plate portions. The crown plate portions and the root plate portions are connected to each other by a series of substantially radially oriented web walls to present a circumferentially extending, corrugated configuration to the mounting sleeve, and the corrugated configuration operatively effects the driving engagement between the sleeve and the clutch drum. A series of first locking dogs extend radially inwardly from at least selected crown plate portions. The first locking dogs are disposed in opposition to a locating rim on the mounting sleeve releasably to secure the sleeve to the clutch drum. A series of annularly disposed stop surfaces are presented radially outwardly from at least selected of the root plate portions, and a series of second locking dogs extend radially outwardly from at least selected root plate portions. The stop surfaces and the second locking dogs are adapted to engage the power take-off ring gear therebetween and thereby releasably secure the power take-off ring to the mounting sleeve.

3 Claims, 3 Drawing Sheets

MOUNTING DEVICE FOR SECURING A RING GEAR TO A DRIVE DRUM

TECHNICAL FIELD

The present invention relates generally to gear assemblies. More particularly, the present invention relates to an arrangement for mounting ring gears to a rotatable drive drum. Specifically, the present invention relates to a novel mounting sleeve which not only facilitates demountably securing a ring gear to the clutch drum on the clutch housing of a vehicular transmission but which also effects a rotational driving connection between the ring gear and a clutch drum.

BACKGROUND OF THE INVENTION

Power take-off ring gears are typically mounted on the radially outer surface of a clutch housing in the transmission of a vehicular drive train. In such an arrangement an annular clutch drum is presented as the radially outermost element of a rotatable clutch housing. The radially outer surface of the clutch drum is splined to effect a rotational driving connection with a power take-off ring gear received thereon. Two annular grooves are machined in the radially outer surface of the clutch drum, and a snap ring, or other retaining device, is received within each groove to embrace the hub of a ring gear therebetween and thereby maintain the ring gear at the desired axial location along the clutch drum.

In such prior art arrangements the clutch drum is also extended for a sufficient axial extent to permit machining one or more additional annular grooves on the radially inwardly directed surface of the annular clutch drum to receive, and/or position, several components of the transmission which are conveniently located interiorly of the clutch drum.

The known prior art arrangements thus required that the clutch drum have a rather significant axial extent. In view of the fact that clutch housings are generally metallic castings, the axial extent required for the clutch drum as well as the several machining steps required to be performed upon both the radially outer, and the radially inner, surfaces of the clutch drum contribute significantly to the overall manufacturing cost of the clutch housing. The manufacturing cost includes not only of the direct cost of the materials and the labor required to machine the several grooves but also the cost incurred by scrapping unsatisfactory clutch housings, the likelihood of which is increased not only because of the complexity of casting a clutch housing having an axially extended clutch drum but also because of the machining steps required to provide the several grooves utilized in the prior art arrangement.

In addition, the axial extent of the clutch drum required by the prior art arrangement increases the mass of the clutch drum and thereby effects a concomitant increase to the moment of inertia as well as the radius of gyration for the clutch housing. That is, the clutch drum is located at the radially outermost extent of the clutch housing so that any excessive mass thereof tends to increase the moment of inertia and the radius of gyration for the overall clutch housing.

SUMMARY OF THE INVENTION

It is, therefore, a primary object of the present invention to provide an improved structural arrangement by which to secure a ring gear to the clutch drum of a clutch housing.

It is a another object of the present invention to provide an improved structural arrangement, as above, which includes a mounting sleeve.

It is a further object of the present invention to provide an improved structural arrangement, as above, wherein the utilization of a mounting sleeve allows the axial extent of the clutch drum, and thus the mass as well as the moment of inertia and the radius of gyration thereof, to be significantly reduced.

It is still another object of the present invention to provide an improved structural arrangement, as above, whereby the utilization of a mounting sleeve obviates the necessity for machining annular grooves in the interior, or exterior, surfaces of the clutch drum.

It is still further object of the present invention to provide an improved structural arrangement, as above, whereby the mounting sleeve can be demountably secured to the clutch drum, and the ring gear can, in turn, be releasably secured to the mounting sleeve.

It is an even further object of the present invention to provide an improved structural arrangement, as above, wherein a mounting sleeve is uniquely configured to achieve the aforesaid results.

These and other objects of the invention, as well as the advantages thereof over existing and prior art forms, which will be apparent in view of the following detailed specification, are accomplished by means hereinafter described and claimed.

In general, a structural arrangement embodying the concepts of the present invention is utilized for demountable securing a power take-off ring gear to the clutch drum of a vehicular transmission. The essence of that structural arrangement comprises a mounting sleeve for releasably securing the power take-off ring to a splined clutch drum and for operatively effecting a rotational driving connection therebetween. The mounting sleeve has a generally annular body portion configured as an alternating series of circumferentially spaced, radially outer crown plate portions and circumferentially spaced root plate portions radially displaced from the crown plate portions. The crown plate portions and the root plate portions are connected to each other by a series of substantially radially oriented web walls.

The crown plate portions, the root plate portions and the web walls delineate a circumferentially extending, corrugated configuration to the mounting sleeve, and the corrugated configuration operatively effects the driving engagement between the sleeve and the splined clutch drum.

A series of locking dogs extending radially inwardly from at least selected crown plate portions operatively to engage the clutch drum upon which the mounting sleeve is received. Specifically, the inwardly extending locking dogs demountably secure the sleeve to the clutch drum.

A series of annularly disposed stop surfaces are presented radially outwardly from at least selected of the root plate portions, and a series of second locking dogs extend radially outwardly from at least selected root plate portions. The stop surfaces and the second locking dogs are adapted to engage the power take-off ring gear therebetween and thereby releasably to secure the power take-off ring to the mounting sleeve.

The detailed description of one exemplary mounting sleeve, as explained in conjunction with a representative vehicular transmission, is deemed sufficient to effect a full disclosure of the subject invention, is shown by way of example in the accompanying drawings and is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
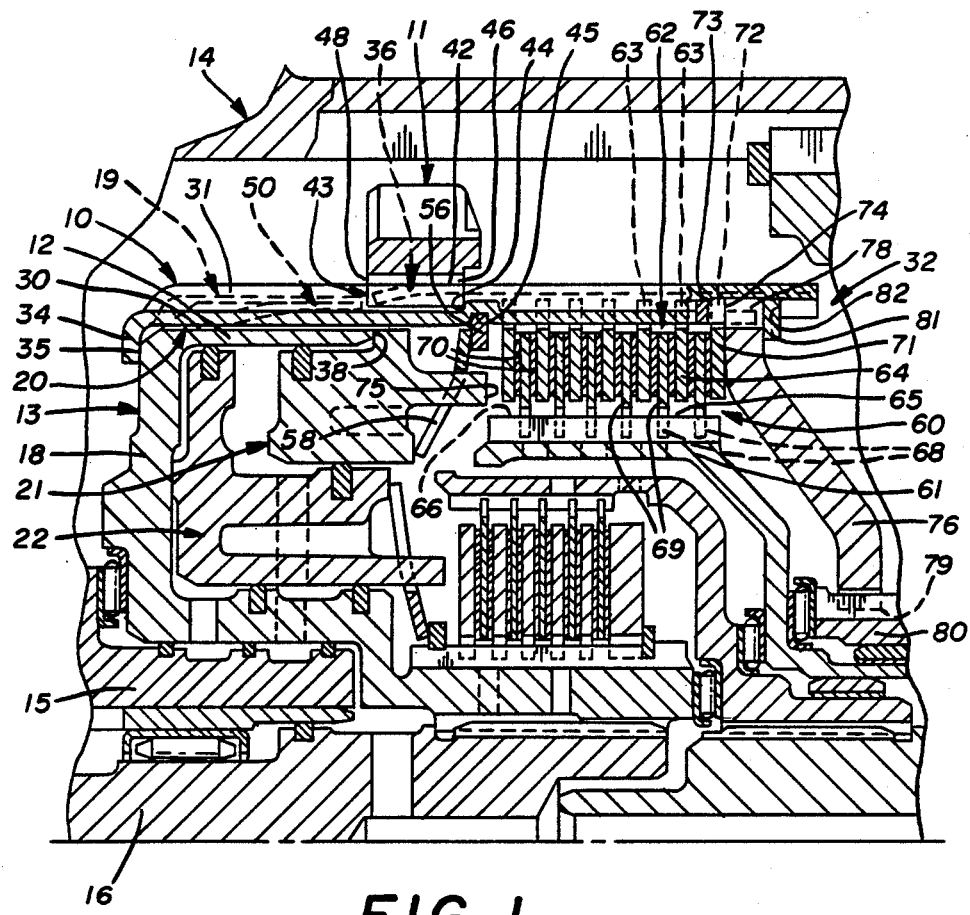
FIG. 1 is a cross section through a portion of a vehicular transmission which incorporates a novel and unique mounting sleeve embodying the concepts of the present invention that is itself demountably secured to a clutch drum in the transmission and is utilized for releasably securing a power take-off ring to the clutch drum for operatively effecting a drive connection therebetween.
Figure 4:
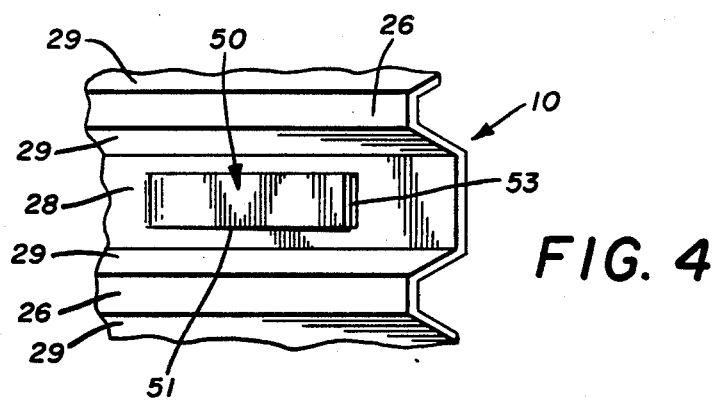
FIG. 4 is an enlarged plan view taken substantially along line 4—4 of FIG. 3 depicting a portion of the mounting sleeve and the configuration of one of the locking dogs employed therein, FIG. 4 appearing on the same sheet of drawings as FIG. 1; and, FIG. 5 is an enlarged, perspective view of the mounting sleeve depicted in the previously described FIGS.

One representative form of a mounting sleeve embodying the concepts of the present invention is designated generally by the numeral 10 on the accompanying drawings. The representative mounting sleeve 10 is depicted as being operatively interposed between a gear member such as a power take-off ring gear 11 and a drive drum. The drive drum may, as represented, comprise the clutch drum 12 presented as the radially outermost portion of a clutch housing 13 in a representative vehicular transmission 14. The clutch housing 13 has a central hub portion 15 that is normally secured to the power input shaft 16 such that the clutch housing 13 always rotates in conjunction with the input shaft 16. An end wall, or spider, 18 extends radially outwardly from the hub portion 15 to intersect, and terminate, with the annular clutch drum 12. The radially outermost surface 19 of the clutch drum 12 is splined, as at 20. In prior art arrangements the splines 20 were employed to effect a direct, driving connection between the clutch drum 12 and a power take-off ring gear, such as identified by the numeral 11. The present invention utilizes the splines 20, but not to effect a direct connection between the clutch drum 12 and the power take-off ring gear 11, as will hereinafter be more fully explained.

One or more actuating piston assemblies may be interposed between the central hub portion 15 and the annular clutch drum 12 of the clutch housing 13. As depicted, two actuating piston assemblies 21 and 22 may be conveniently received therebetween. The general operation of actuating piston assembly 21 will be hereinafter briefly discussed in order to facilitate an understanding of the several functions performed by the mounting sleeve 10. However, no detailed explanation as to the operation of the actuating piston assemblies is deemed necessary in view of the fact that several variations thereof are well known to the art.

Figure 2:
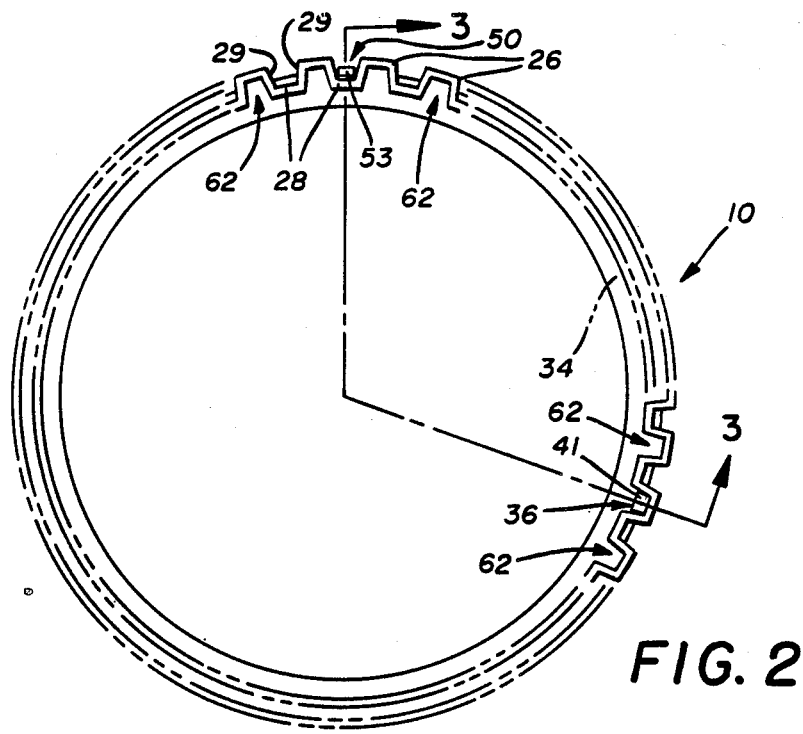
FIG. 2 is an end elevation of the mounting sleeve depicted in FIG. 1.
Figure 3:
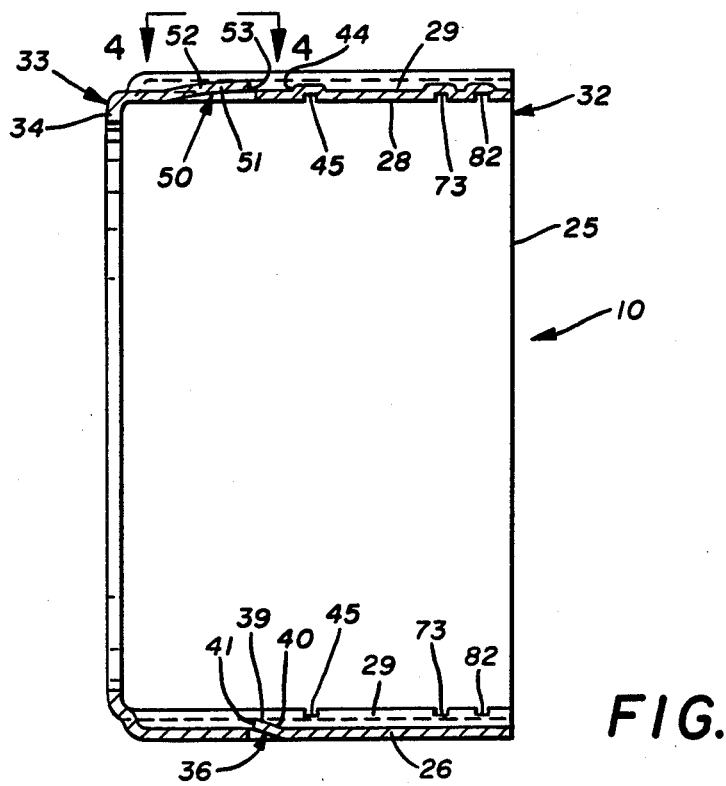
FIG. 3 is cross sectional view taken substantially along line 3—3 of FIG. 2.
Figure 5:
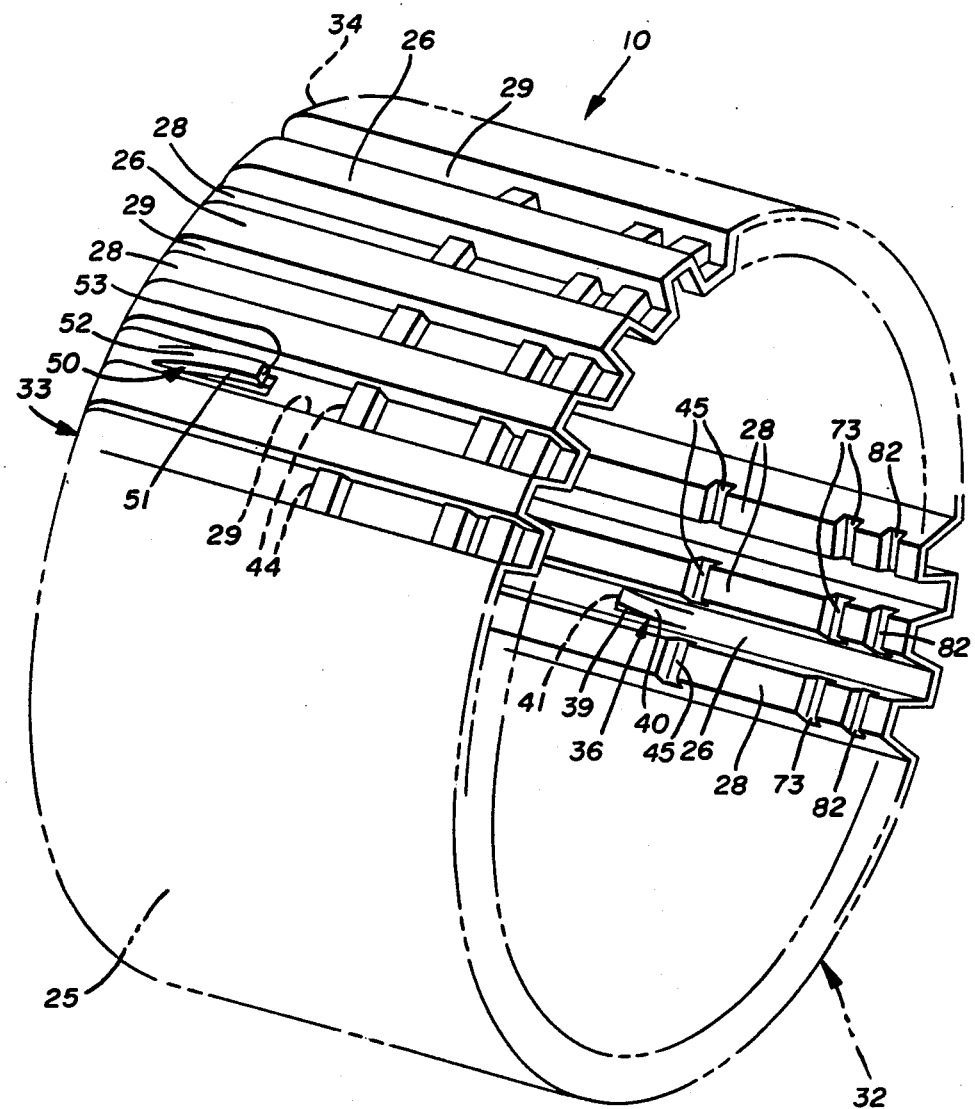

Turning, then, to a discussion of the mounting sleeve 10, as best seen in FIGS. 2, 3, and 5, it may well comprise a generally annular body portion 25 of sheet metal—typically on the order of 10–12 gauge which measures from about 0.140 inches (3.56 mm) to about 0.109 inches (2.00 mm) in thickness—that may be formed by such well known techniques as the Grob or hydra-forming processes to present a plurality of crown plate portions 26 that are circumferentially spaced in an alternating series with a plurality of root plate portions 28 that are displaced radially inwardly from the crown plate portions 26. The successive series of crown plate and root plate portions 26 and 28, respectively, are joined by generally radially inclined web walls 29. This structural arrangement delineates a circumferentially extending, corrugated configuration to the sleeve 10 which allows the sleeve 10 operatively to interfit with the splines 20 presented by the outermost surface 19 on the clutch drum 12 of the clutch housing 13. Specifically, the root plate portions 28 of the mounting sleeve 10 fit within the grooves 30 of the splines 20 formed on the outermost surface 19 of the clutch drum 12. Similarly, the crown plate portions 26 on the mounting sleeve 10 are disposed to overlie to the lands 31 formed on the outermost surface 19 of the clutch drum 12. The interfitting relationship between the sleeve 10 and the clutch drum 12, as thus described, effects a rotational driving connection therebetween such that rotation of the clutch drum 12 forces the mounting sleeve 10 to rotate therewith. The axial alignment of the splines 20 on the clutch drum 12 with the orientation of the corrugated configuration provided by the crown plate portions 26, the root plate portions and the inclined web walls 29 of the mounting sleeve 10 permits the mounting sleeve 10 to be translated axially along the clutch drum 12. In fact, the first end 32 on the body portion 25 of the mounting sleeve 10 is unrestricted to permit the mounting sleeve 10 to slide freely onto, and along, the clutch drum 12.

The second end 33 on the body portion 25 of the mounting sleeve 10 presents a locating rim 34 which extends radially inwardly from the body portion 25 to engage a locating surface 35 at the intersection of the end wall 18 and the annular clutch drum 12 in order to determine the extent to which the mounting sleeve 10 can slide axially along the clutch drum 12.

A pawl-like, first locking dog 36 extends radially inwardly from at least selected crown plate portions 26. The locking dogs 36 are located in a predetermined, axially spaced relation relative to the locating rim 34, and the locking dogs 36 engage the transverse, planar, end wall 38 of the clutch drum 12. When the locating rim 34 on the mounting sleeve 10 engages the locating surface 35 on the clutch drum 12 in opposition to the engagement of the first locking dogs 36 on the mounting sleeve 10 with the transverse end wall 38 on the clutch drum 10, the axial location of the mounting sleeve 10 on the clutch drum 12 is secured.

Each locking dog 36 has a shank 39 which presents cam-like ramp 40 that extends angularly inwardly from the crown plate portion 26 and terminates in a transversely oriented blocking face 41. The blocking face 41 is disposed in radially inwardly spaced relation with respect to the crown plate portion 26. In addition, thee blocking face 41 is disposed in opposition to the locating rim 34, and as such it is the blocking face 41 on the first locking dog 36 which engages the transverse end wall 38 on the clutch drum 12.

That end of the shank 39 oppositely from the blocking face 41, and thus the end remote with respect to the locating rim 34, is preferably joined integrally to the crown plate portion 26. In fact, the preferred manner by which to form the first locking dogs 36 is to lance or otherwise form them by displacement from their respective crown plate portions 26. Because the locking dogs 36 have been struck from the sheet metal of which the crown plate portions 26 are formed, the shank 39 will have sufficient resiliency to permit each first locking dog 36, in response to the application of a biasing force to the ramp 40, to be swung into general alignment with the crown plate portion 26, and, upon the release of the biasing force, to swing back into their angularly inwardly disposed orientation relative to the crown plate portion 26. Thus, when one slides the mounting sleeve 10 onto the clutch drum 10 engagement of the ramp 40 on each locking dog 36 with the intersection of the end wall 18 and clutch drum 12 on the clutch housing 13 will require the application of sufficient axially directed force to the mounting plate 10 biasingly to displace the resilient locking dogs 36 and allow them to be slid axially along the appropriate lands 31 on the spline 20 presented from the clutch drum 12 until the blocking face 41 on each locking dog 36 clears the end wall 38 of the clutch drum 12. When the parts are so disposed, the resilience of the locking dogs 36 will cause them to swing inwardly and position the blocking face 41 on each in engagement with the end wall 38 of the clutch drum 12. Simultaneously therewith the locating rim 34 on the mounting sleeve 10 will engage the locating surface 35 on the clutch drum 12 to secure the mounting sleeve 10 to the clutch drum 12, as previously described.

Conversely, the mounting sleeve 10 can be removed from the clutch drum 12 by biasing the first locking dogs 36 radially outwardly until the blocking face 41 on each clears the land 31 of the spline 20 on the clutch drum 12 and then axially sliding the sleeve 10 off the clutch drum 12.

Axially oriented splines 42 are customarily provided along the radially innermost surface on the hub 43 of a power take-off ring gear 11, and the present invention also utilizes splines 42 on the radially innermost surface of the hub 43 on the power take-off ring gear 11. Specifically, the splines 42 on the radially innermost surface of the power take-off ring gear 11 interact with the corrugated configuration of the mounting sleeve 10 to permit the ring gear 11 to be slid axially along the mounting sleeve 10 and yet to provide the necessary interconnection therebetween to force the ring gear 11 to rotate with the mounting sleeve 10 as the sleeve 10 is rotated with the clutch drum 12.

The axial location of the ring gear 11 with respect to the mounting sleeve 10 is determined by an annularly disposed stop surface 44 which is presented to extend radially outwardly from the root plate portions 28 of the mounting sleeve 10. Because the mounting sleeve 10 may be fabricated from sheet metal, it is possible to cold work the metal such that a first, annular groove 45 formed on the radially interior of the root plates 28 will cause the metal of the root plates 28 and the inclined web walls 29 to bulge radially outwardly. This bulge formed by the working of the metallic mounting sleeve 10 presents the stop surfaces 44 against which the hub 43 on the power take-off ring gear 11 can be abutted to determine the extent to which the ring gear 11 can be axially displace along the mounting sleeve 10.

Specifically, the stop surface 44 extends outwardly from the root plate portions 28 to engage one side 46 on the hub 43 of the power take-off ring gear 11. The second side 48 of the hub 43 on the power take-off ring gear 11 is releasably engaged by a plurality of pawl-like, second locking dogs 50. Each second locking dog 50 also has a shank portion 51, one end of which is preferably integral with the root plate portion 28. In fact, the second locking dogs 50 are also preferably lanced from the metal of the mounting sleeve 10, but the locking dogs 50 are struck from the root plate portions 28 rather than the crown plate portions 26.

In the alternative, the locking dogs 50 may be struck from the crown plate portions 26. The shank portion 51 of each second locking dog 50 presents a cam-like ramp 52 which extends angularly outwardly from the root plate portion 28 and terminates in a blocking face 53 that is disposed in radially outwardly spaced relation with respect to the root plate portion 28 and in opposition to the stop surface 44. It is the blocking face 53 on the second locking dog 50 which engages the second side 48 on the hub 43 of the power take-off ring gear 11, and as such the axial orientation of the second locking dog 50 is opposite to the axial orientation of the first locking dogs 36.

Because the locking dogs 50 have been struck from the sheet metal from which the crown plate portion 28 has been formed, the shank portion 51 of each second locking dog 50 will also have sufficient resiliency to permit each locking dog 50, also in response to the application of a biasing force to the ramp 52 on the shank portion 51, to be swung into, or beyond, alignment with the root plate portion 28, and, upon release of the biasing force, to swing back into its angularly outwardly disposition relative to the root plate portion 28. Thus, when one slides the power take-off ring gear 11 onto the mounting sleeve 10, engagement of the hub 43, on the ring gear 11, with the ramp 52 will require the application of sufficient axially directed force to the ring gear 11 biasingly to displace each resilient, second locking dog 50 and allow them to slide axially along the splines 54 presented by the radially innermost surface of the hub 43 on ring gear 11. When the hub 43 of the ring gear 11 slides beyond the second locking dog 50, the resilience of the second locking dogs 50 will cause them to swing outwardly and position the blocking face 53 on each in engagement with the second side 48 of the hub 43 on the ring gear 11. Simultaneously therewith the first side 46 on the hub 43 of the ring gear 11 will engage stop surface 44 on the mounting sleeve 10 to secure the ring gear 11 in its predetermined location relative to the mounting sleeve 10, and thus the clutch drum 12 on the clutch housing 13.

Conversely, the ring gear 11 can be removed from the mounting sleeve 10 by biasing the second locking dogs 50 radially inwardly and sliding the ring gear 11 off the mounting sleeve 10. To preclude inadvertent removal of the ring gear 11 when the mounting sleeve 10 is received on the clutch drum 12, the shank portion 51 of the second locking dog 50 may extend in an arcuate path (as best seen in FIGS. 2 and 5) from its intersection with the root plate portion 28 to the blocking face 53. In that way the locking dog 50 may interfere with the base of the spline groove 30 in the clutch drum 12 should the locking dog 50 be biased radially inwardly while the mounting sleeve 10 is still received on the clutch drum 12.

With reference again to FIG. 1 it will be observed that the first groove 45 on the mounting sleeve 10 not only forms the stop surface 44 but provides a recess within which an annular positioning ring 56 may be received to engage, and axially locate, the annular return spring 58 which biases the first actuating piston assembly 21 away from a torque transfer device 60. The torque transfer device 60 associated with the first actuating piston assembly 21 is interposed between two relatively rotatable members. In the transmission depicted the relatively rotatable members are the mounting sleeve 10 (which is rotatably secured to the clutch drum 12) and the drive hub 61 of a planetary gear system, not shown. The corrugated configuration of the mounting sleeve 10 provides the axially oriented slots, or recesses, 62 to receive the tangs 63 of a plurality of first, annular torque plates 64 and thereby assure that the first torque plates 64 are not relatively rotatable with respect to the mounting sleeve 10. To assure that the interaction between the mounting sleeve 10 and the tangs 63 is sufficient to withstand the loading to which the tangs will be subjected, a sufficient number of tangs 63 may be provided on the first torque plates 64 to interact with the slots 62 presented around the circumference of the mounting sleeve 10.

The radially outer surface 65 of the drive hub 61 may be axially slotted, as at 66, at circumferentially spaced intervals about the outer surface 65 thereof to receive the several tangs 68 which extend radially inwardly from each of the plurality of second, annular torque plates 69 and thereby assure that the second torque plates 69 will not rotate relative to the drive hub 61, as is also well known to the art.

An annular friction disk 70 is interposed between each successive first and second torque plate 64 and 69. To assure that the several friction disks 70 will not be displaced when they are not compressed between the successive first and second torque plates 64 and 69, each friction disk 70 is preferably secured to one of the torque plates 64 or 69 between which it is sandwiched. As is well known to the art, the friction disks 70 may be bonded to either the first or second torque plates 64 or 69 by a suitable adhesive.

An annular backing plate 71 is also preferably provided with a plurality of tangs 72 which extend radially outwardly therefrom to be received within the axial slots 62 in the mounting sleeve 10. A second, annular groove 73 is cold worked within the circumferential interior of the mounting sleeve 10 to receive a snap ring 74, or the like, to preclude axial displacement of the backing plate 71 away from the first and second torque plates 64 and 69 when the first actuating piston assembly 21 drives its engaging surface 75 against the interleaved series of first and second torque plates 64 and 69 until they bottom against the backing plate 71. When the first and second series of torque plates 64 and 69 are thus firmly sandwiched between the backing plate 71 and the engaging surface 75 presented from the actuating piston assembly 21 relative rotation between the torque plates 64 and 69 is precluded, as is relative rotation between the mounting sleeve 10 and the drive hub 61.

An output drive hub 76-has a cylindrical exterior configuration such that a plurality of radially outwardly directed tangs 78 presented therefrom can also be received with the axially oriented slots 62. The central apex 79 of the drive hub 76 is secured, as well known to the art, to a sleeve shaft 80 that is connected to another planetary gear system, also not shown. A snap ring 81, or other retaining device, may be operatively received with a third, annular groove 82 that is cold worked within the circumferential interior of the mounting sleeve 10.

As should now be apparent, the present invention not only teaches the construction for an improved mounting sleeve by which demountably to secure a power take-off ring gear to the clutch drum of a vehicular transmission but also accomplishes the other objects of the invention.

The invention is also useful with formed hub sleeve structures wherein the gear member is disposed on the inner surface of the sleeve. In this instance, of course, the locating member would be deformed inwardly to provide stop surfaces as the gear member is assembled into the sleeve.

The embodiments of the invention in which an exclusive property or privilege is claimed are defined as follows:

1. A mounting sleeve for releasably securing a gear member to a splined drive drum and for operatively effecting a driving connection therebetween, said sleeve comprising:

a generally annular body portion configured as an alternating series of circumferentially spaced, radially outer, crown plate portions and circumferentially spaced root plate portions displaced radially inwardly with respect to said crown plate portions;

said crown plate portions and said root plate portions being connected by substantially radially oriented web wall such that said crown plate portions, said root plate portions and said web walls delineate a circumferentially extending, corrugated configuration to said sleeve, to operatively to effect a driving engagement between said sleeve and the splined drive drum;

a series of locking dogs extending radially inwardly from at least selected of said crown plate portions to engage said drive drum, thereby releasably securing said sleeve to said drive drum;

a series of annularly disposed stop surfaces presented radially outwardly from at least selected of said root plate portions and said crown plate portion; and, locking means cooperating with at least selected ones of said root plate portions and said crown plate portions;

said stop surfaces and said locking means adapted to engage said gear member therebetween, thereby releasably securing said gear member to said sleeve.

2. A mounting sleeve for releasably securing a ring gear to a splined drive drum and for operatively effecting a driving connection therebetween, said mounting sleeve comprising:

a generally annular body portion configured as an alternating series of circumferentially spaced, radially outer, crown plate portions and circumferentially spaced root plate portions displaced radially inwardly with respect to said crown plate portions;

said crown plate portions and said root plate portions being connected by substantially radially oriented web walls such that said crown plate portions, said root plate portions and said web walls delineate a circumferentially extending, corrugated configuration to said sleeve, whereby operatively to effect a driving engagement between said sleeve and the splined drive drum;

a radially inwardly directed locating rim to engage said drive drum when said sleeve is operatively received thereon;

a series of first locking dogs formed, and extending radially inwardly, from at least selected of said crown plate portions; said first locking dogs each having first and second end portions with a shank extending therebetween;

said first end portion of each said shank secured to said crown plate portion from which said first locking dog is formed;

said second end portion presenting a blocking face that is disposed in radially inwardly spaced relation with respect to said crown plate portion to engage the drive drum, whereby releasably to secure said mounting sleeve to the drive drum;;

a series of annularly disposed stop surfaces presented radially outwardly from at least selected of said root plate portions; a series of second locking dogs extending radially outwardly from at least selected of said root plate portions;

said second locking dogs each having first and second end portions with a shank extending therebetween;

said first end portion on each said second locking dog secured to said root plate portion from which said second locking dog is formed;

said second end portion on said second locking dog presenting a blocking face that is disposed in radially outwardly spaced relation with respect to said root plate portion to engage the ring gear, thereby releasably securing the ring gear to said sleeve.

3. A mounting sleeve for releasably securing a gear member to a splined drive drum and for operatively effecting a drive connection therebetween, said mounting sleeve comprising:

a generally annular body portion configured as an alternating series of circumferentially spaced, radially outer, crown plate portions and circumferentially spaced root plate portions displaced radially inwardly with respect to said crown plate portions;

said crown plate portions and said root plate portions being connected by substantially radially oriented web walls such that said crown plate portions, said root plate portions and said web walls delineate a circumferentially extending, corrugated configuration to said mounting sleeve, whereby operatively to effect a driving engagement between said mounting sleeve and the splined drive drum;

a radially inwardly directed locating rim to engage said drive drum when said sleeve is operatively received thereon;

a series of first locking dogs formed, and extending radially inwardly, from at least selected of said crown plate portions; said first locking dogs each having first and second end portions with a shank extending therebetween;

said first end portion of each said shank secured to said crown plate portion from which said first locking dog is formed;

said shank presenting a cam-like ramp surface extending angularly from said crown plate portion and terminating at said second end portion in a blocking face that is disposed in radially inwardly spaced relation with respect to said crown plate portion and in opposition with respect to said locating rim to engage the drive drum releasably to secure said mounting sleeve to the drive drum;

a series of annularly disposed stop surfaces presented radially outwardly from at least selected of said root plate portions;

a series of second locking dogs extending radially outwardly from at least selected of said root plate portions;

said second locking dogs each having first and second end portions with a shank extending therebetween;

said first end portion of each said second locking dog secured to said root plate portion from which said second locking dog is formed;

said shank presenting a cam-like ramp surface extending angularly from said root plate portion and terminating at said second end portion in a blocking face that is disposed in radially outwardly spaced relation with respect to said root plate portion and in opposition with respect to said stop surfaces to engage the gear member to releasably secure the gear member to said mounting sleeve.

* * * * *